United States Patent [11] 3,600,593

[72] Inventor Robert M. Berler
Westport, Conn.
[21] Appl. No. 875,473
[22] Filed Nov. 10, 1969
[45] Patented Aug. 17, 1971
[73] Assignee Pitney Bowes-Alpex, Inc.
Danbury, Conn.

[54] HAND HELD PRINTED TICKET READER COMPRISING A RECTILINEARLY MOVING SCANNING LENS
9 Claims, 11 Drawing Figs.

[52] U.S. Cl. 250/219 DC, 235/61.11 E, 250/234, 250/235
[51] Int. Cl. G01n 21/30, G06k 7/00, H01j 3/14
[50] Field of Search 250/219 DD, 219 DC, 234, 235; 235/61.11 E, 61.11 G

[56] References Cited

UNITED STATES PATENTS

| | | | |
|---|---|---|---|
| 2,184,157 | 12/1939 | Jones | 250/219 IDCX |
| 2,834,005 | 5/1958 | Ketchledge | 235/61.11 E |
| 3,091,699 | 5/1963 | Hammar | 250/219 ID |
| 3,305,691 | 2/1967 | Hock | 250/235 |
| 3,331,963 | 7/1967 | Lippke | 250/235 X |
| 3,413,447 | 11/1968 | LaMers | 250/219 ID |
| 3,509,354 | 4/1970 | Reilly | 250/219 ID |

*Primary Examiner*—James W. Lawrence
*Assistant Examiner*—T. N. Grigsby
*Attorney*—Arthur J. Plantamura

ABSTRACT: A photo optical hand held reader which is positionable over a printed mark document and held stationary while a lens contained in the reader housing is moved so as to scan the printed information on the document. A light source housed in the reader provides the necessary illumination to permit the images from the printed marks to be reflected through the lens to an array of photoelectric sensors which converts the images, by means of logic and other signal processing circuits, to intelligible information.

*INVENTOR.*
ROBERT M. BERLER
BY
Arthur J. Plantamura
ATTORNEY.

INVENTOR.
ROBERT M. BERLER
BY
Arthur J. Plantamura
ATTORNEY.

*INVENTOR.*
ROBERT M. BERLER
BY
Arthur J. Plantamura
ATTORNEY.

HAND HELD PRINTED TICKET READER COMPRISING A RECTILINEARLY MOVING SCANNING LENS

CROSS REFERENCE TO RELATED APPLICATION

In my copending U.S. Pat. application entitled Hand Held Coded Document Photo-Optical Reader, filed on July 29, 1969, Ser. No. 845,860, a manual or portable device into which a punched hole coded ticket may be inserted for reading is described and claimed. That device requires that the ticket be physically inserted into a slot in the unit in order to read it. That reader is not capable of reading a document which is glued or otherwise secured to a surface unless the ticket to be decoded was first removed or lifted from the surface to an extent sufficient to insert it into the reader.

BACKGROUND OF THE INVENTION

In attempting to provide a system which uses a hand held unit capable of reading information directly from imprint on a surface without feeding the ticket or other substrate containing the imprint into the reader, a number of considerations, including the following, are important:

The reader should be capable of sensing the information from a printed surface without the necessity of moving the surface, i.e. it should be possible to read the imprinted document while it is secured, e.g. pasted, on a flat or substantially flat surface.

When a ticket is the document, i.e. the matrix on which the information is imprinted, an inexpensive computer printed ticket can be generated.

The system should preferably accommodate a 15-digit capacity.

Punched holes, indentations or other configurations other than computer printed symbols should be avoided.

Perhaps the most difficult problem encountered when attempting to read by machine a completely glued down document or alternately a nonremovable imprint, is proper alignment of the reader when placed over the printed block or ticket by an operator. To be practical, it is important that alignment be quickly and easily accomplished by an unskilled operator. The problems of alignment involve:

1. Aligning the reader on the X-axis of the printed block or ticket.
2. Aligning the reader on the Y-axis.
3. Proper orientation of the reader.
4. A combination of orientation and alignment on the X and Y axes.

Another difficulty with hand held document readers is that of scanning and retrieving the coded information. This problem involves:

1. Resolving the individual code marks.
2. Maintaining full coded line coincidence.
3. Scanning each line with the photosensors.
4. Illuminating the document properly for maximum signal pickup by the photosensor.
5. Maintaining maximum signal to no-signal ratio.

The invention will be described hereinafter by reference to a printed document, e.g. a ticket, which is adhered to a surface, although it will be apparent that the reader may be utilized to read information which has been printed on any suitable surface and in a manner which permits the reader to be properly indexed on the printed information.

SUMMARY OF THE INVENTION

This invention relates to a novel compact hand held reader for photo-optically sensing information printed on a coded document, e.g. a ticket, which may be affixed to an article. This device, which is hand powered and contains no motor, is capable of reading information on the ticket without removing the ticket from the article, i.e. while the ticket remains pasted on the surface of the article. In essence, the reader comprises a housing which substantially excludes light and generally is of a size which may be held conveniently in the hand. In size and appearance it may resemble hand held office equipment such as a stamping machine of the kind conventionally used to imprint a block of information on a surface or a stapler, for example. The housing contains a photoelectric cell array to read a full line of printed information simultaneously, a movable lens which scans the printed information on the ticket and through which the information is focused onto the photoelectric cells of the array and a light source to illuminate the ticket.

BRIEF DESCRIPTION OF THE DRAWING

Referring to the drawing:

FIGS. 7*a*, 7*b* and 7*c* illustrate schematically the actuation and movement of the lens support and light baffle during the course of reading a printed surface by the reader of FIG. 5.

Figure 3A:
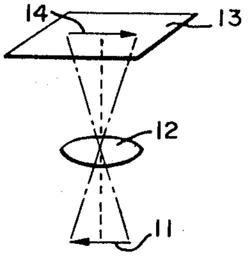
FIG. 3*a* and 3*b* and FIGS. 4*a* and 4*b* illustrate schematically the mechanisms which permits the reader of the invention to receive images focused by the movable lens of the reader.

The principle of operation of the reader contemplated by the present invention will be described by reference to FIGS. 3 and 4. The elements of FIG. 3 may be viewed as those of a simple box camera, a convex lens 12 allows the image 14 of an object 11 to be projected upon the film 13. In this case, the object 11 is shown as an arrow. The image 14 as projected on the film is reversed from the object 11. The size of the image 14 depends upon the distance of the object from the lens 12 as well as the lens focal length, and the object size itself. If the object arrow 11 is moved towards the right, the image 14 which is cast onto the film would then move to the left (as a result of image reversal).

Figure 3B:
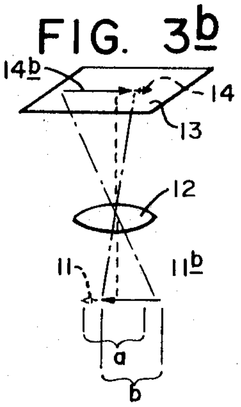

In FIG. 3*b* the new positions of the object 11 and image 14 are shown at 11*b* and 14*b* respectively. In this movement the lens 12 and film or screen 13 has remained in fixed position; only the object 11 has been moved.

Figure 4A:
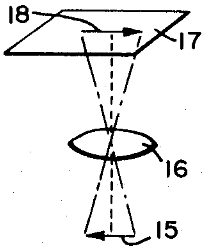
Figure 4B:
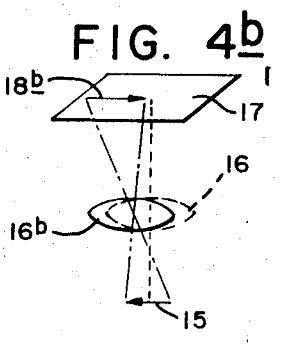

In FIGS. 4*a* and 4*b*, the illustration shows how the same shift in the image positions on the screen can be achieved by allowing the arrow 15 to remain fixed in position, but in this case, the lens 16 is shifted to a new position 16*b*.

In FIG. 4*a* the arrow and the lens are shown in their original positions; the image 18 is centered in its original position on the screen 17. In FIG. 4*b*, the lens 16 has shifted to the left from its original position (shown in broken line) to its new position 16*b* (shown in solid line). The object arrow 15 is still in its original position. The image, however, has shifted to the left as has the lens 16. The shifted image is shown at 18*b*.

It is this mechanism of moving the lens to cause the image to be shifted in its position, which is used to scan the document in the ticket reader of the present invention. The document to be read will be placed where the arrow 15 (object) is in a fixed position, and a photocell array will take the place of the screen 17.

In the case where the size of the image is equal to the size of the object (1:1 ), the motion of the scanning lens need travel only half as far in linear distance as the length of the object to be scanned. This is an advantage in favor of designing a more compact reader. In addition, it is mechanically advantageous not to have to move the lens over large distances.

DESCRIPTION OF THE PREFERRED EMBODIMENTS

The three basic components of the optical reader system of the present invention are: (1) the printed surface, i.e. the ticket, (2) the photoelectric array of sensors or detectors, and (3) the optical system.

When the ticket reader is placed over a printed ticket, it must first be indexed for proper alignment on both the X and Y axes of the ticket. The next operation of the reader requires that the entire coded portion of the ticket be scanned to retrieve whatever information is printed thereon for machine reading. The present invention is concerned with a hand held apparatus, hereinafter described in detail, for scanning and reading printed coded information from a surface or ticket without requiring that the ticket on which the information is imprinted be removed or separated from the surface it is attached to.

Figure 1:
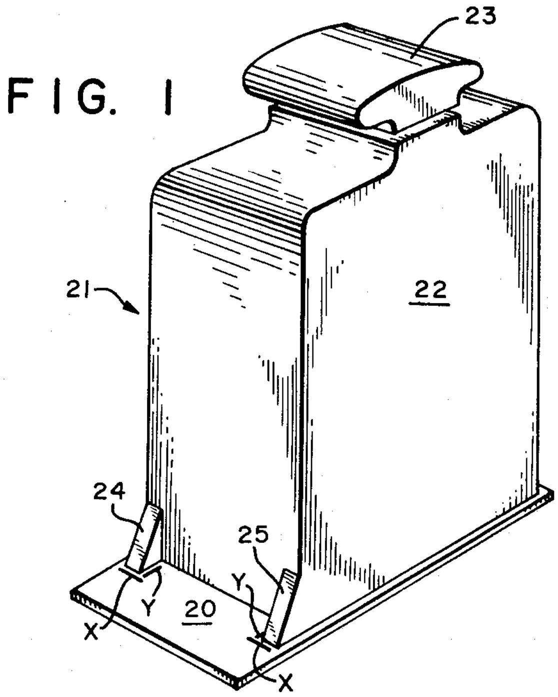
FIG. 1 is a perspective view of the hand held reader positioned over a document to be read.
Figure 2:
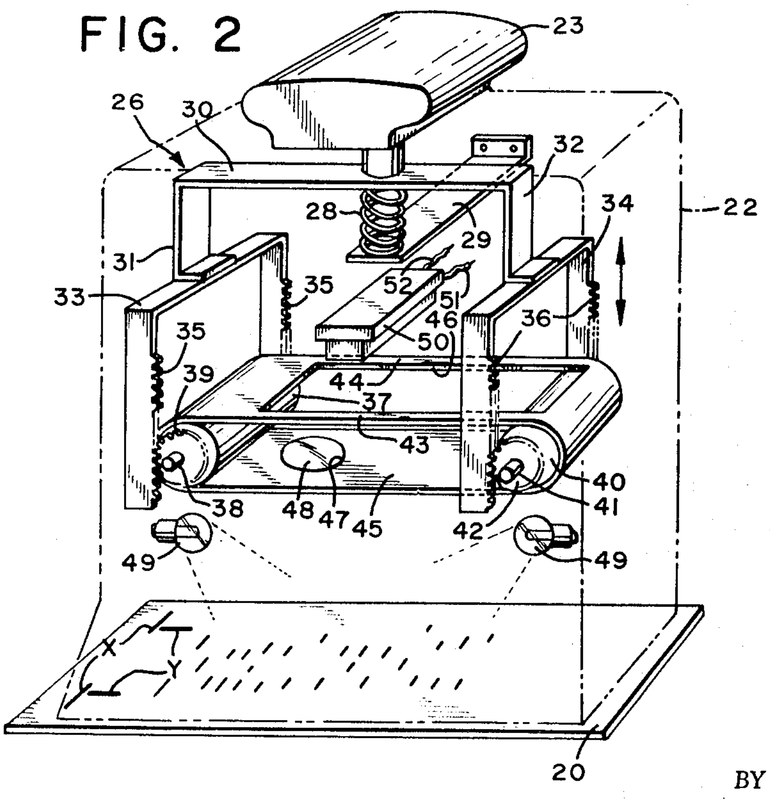
FIG. 2 is a perspective view of the several components which comprise one form of the reader of the invention illustrating the various parts in their operative relationship.

Referring to FIGS. 1 and 2 which show one embodiment of the invention, the reader 21 comprises a suitable housing 22 which is capable of excluding stray light and which contains the several components of the reader. A spring returnable actuating knob or handle 23 which is at rest in the uppermost position has the effect of moving a lens 48 to scan the document 20 when it is depressed. Guides 24 and 25 (FIG. 1) serve to align the reader on the ticket, i.e. on the axes marked X and Y on the ticket 20. The document to be read is viewed through the window or opening formed in the base of housing 22. The knob 23 is held in its uppermost position by a spring 28 which is supported on a fixed bracket or support 29 which in turn is suitably attached to housing 22. Alternately (not shown) the bracket 29 may be secured on or comprise part of a suitable mounting frame. Positioned so as to be actuated by knob 23 in a vertical movement is a frame 26 which comprises a horizontal member 30 and two vertical depending members 31 and 32. Secured to the arms 31 and 32 respectively are bifurcated members 33 and 34 which comprise racks 35 and 36 of a rack and pinion or gear system. A pair of rollers or cylinder 37 and 40, suitably mounted for rotation of axles 38 and 41, carry gears 39 and 42 respectively. The rollers 37 and 40 carry a flexible light shade 45 which is movable as the drums rotate. Formed in one face, i.e. in the upper side as shown, of the flexible light shade is opening 46 and in the other face, i.e. the lower side, is a lens mounting opening 47 into which lens 48 is mounted. Positioned below the flexible light shade 45 is a light source 49 and above the light shade, in suitable horizontal and vertical alignment with the openings 46 and 47 is a photodetector bank 50.

The lens 48 is preferably mounted on a black or opaque flexible light shade or mask 45 which is rolled around the two rollers 37 and 40. The shade 45 may comprise an integral web in which a rectangular cutout or opening 46 is formed. Alternately, the light shade may comprise a structure in which the two ends of the shade 45 are tied to each other by two bands 45 and 44. So that the flexible light shade 45 forms a continuous band around the two rollers 37 and 40 while a space or opening 46 is left between the two ends of the joined light shade for light to pass through. Approximately at the center of the light shade 45 there is a hole 47 over which the lens 48 is attached. When both the rollers 37 and 40 rotate in the same direction as a result of pressing down on the knob 23, the light shade will unwind from the left drum 37 and wind around the right drum 40. This action will cause the lens 48 to move from left to right, thereby scanning the document 20. The light passing upwards from the lens will enter the photocells of the array 50 between the open space 46 of the light shade. The purpose of the light shade is twofold. First to transport the lens in the scanning function and secondly, to block out extraneous light not being imaged by the lens.

When pressure on the knob 23 is relaxed, the spring 28 returns frame 26 and, through racks 35 and 36, the shade 45 and lens 48 to its at rest elevated position.

Switches, photocells, or other means (not shown) but whose use in connection herewith is readily apparent to one skilled in the art, may be provided to start the readout of the document only when the knob 23 is pressed down. As soon as the knob 23 has bottomed and pressure on it is released, the readout information coming out of the photocell array 50 will be cut off so as to prevent unwanted and confusing information from being fed into the logic circuits. In addition, the up and down motion of the knob 23 can also be used to turn the document illuminating lamps on and off at the proper time, if desired.

The housing or case 22 of the reader serves as a mounting for mechanical components, as alight shield to exclude outside light, and as protection for the mechanism. The unit is compact, relatively light in weight, and easy to handle. A coiled cord (not shown) connects the reader through leads 51 and 52 to the logic circuits but allows easy freedom for reading tickets on merchandise by an operator. The reader of the invention can read tickets through a wrapping which is substantially transparent, e.g. polyethylene, polypropylene, nylon, etc. It is also capable of reading information on surfaces, having substantial curvature, e.g. cylindrical metal cans or other containers.

Although FIG. 2 shows two illuminating lamps 49, it is possible to use one or any suitable number necessary to provide the desired illumination. With multiple lamps, such as two or four or more, if one should fail, the light from the remaining lamps will permit uninterrupted operation, thus minimizing down time of the reader.

Figures 5, 6, 7:
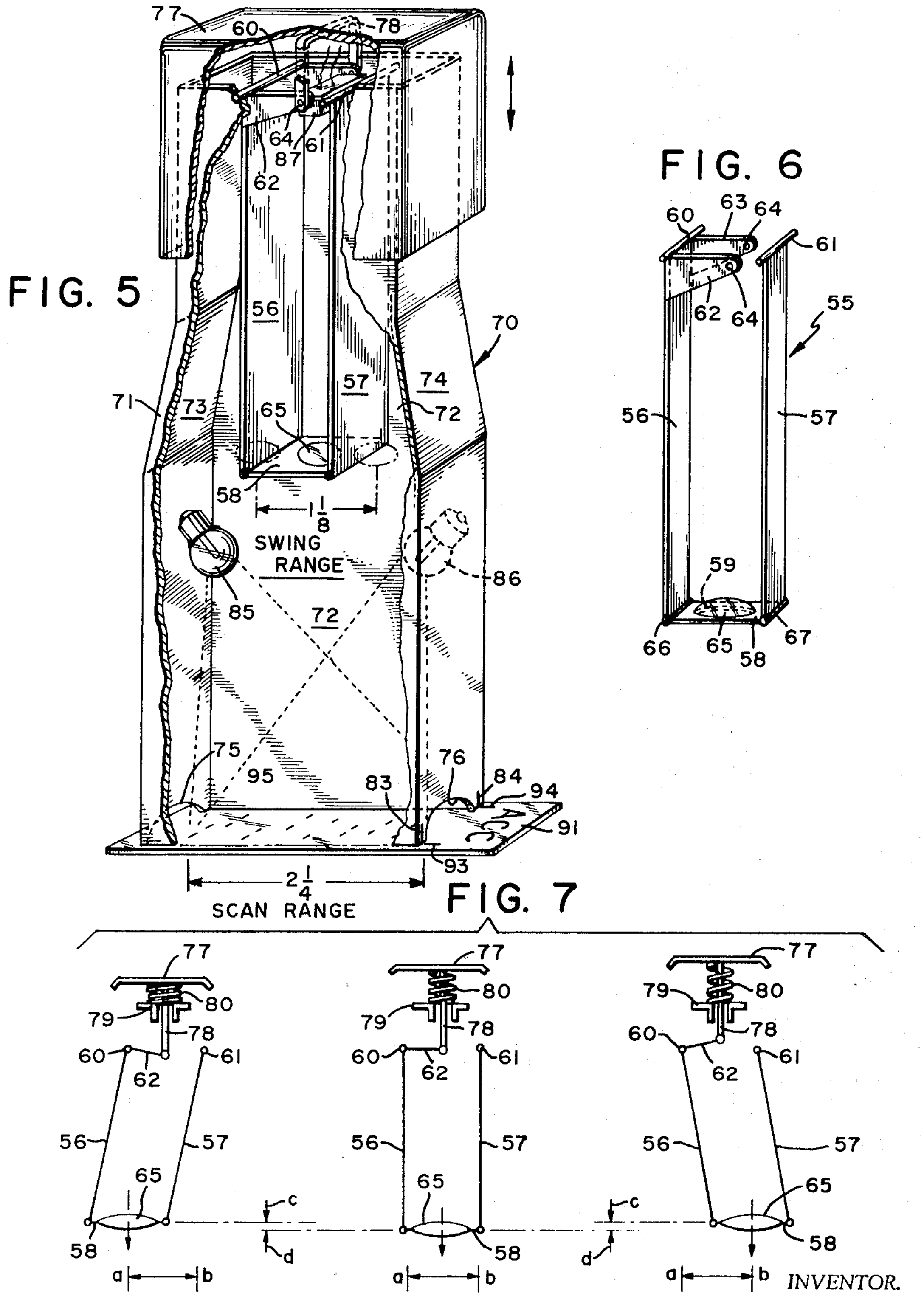
FIG. 5 is a perspective view of the various components which comprise an alternate form of a reader in accordance with the invention.
FIG. 6 is a perspective view of the lens support and light baffle employed in the reader illustrated in FIG. 5.

FIGS. 5—7 illustrate another embodiment which may be employed for moving the lens over the coded document for scanning purposes in accordance with the invention. This embodiment includes a light shade or baffle element which moves in a pendulumlike manner and which carries the lens during the scanning function. The document to be read is viewed through a window or opening in the base of the housing 70.

Referring to FIG. 6, the light shade 55 comprises two flat vertical strips or sides 56 and 57 which are opaque to light, and act both as a lens support and a light baffle. Each of the sides 56 and 57 is supported on the main structure or housing 70 by support pivots 60 and 61, respectively. The bottom end of each of the strips 56 and 57 is attached to the lens mount member 58 by means of hinges 66 and 67 which allow the support 58 to pivot with respect to sides 56 and 57. The lens support member 58, also opaque to light, is provided with an opening 59 over which the scanning lens 65 is mounted. The structure 55 when supported by the two support pivots pins 60 and 61 on the main structure 70 forms a parallelogram. As this parallelogram 55 is pivoted at its top at the fixed pivot points 60 and 61 in the pendulumlike manner, the lower part of the parallelogram in which the lens is mounted, moves from side to side, providing essentially rectilinear motion for lens 65 which parallels the surface to be scanned. Due to the fixed pivot points 60 and 61 and movable pivot points 66 and 67 the lens mount 68 and lens 65 carried thereby, remain in a horizontal plane (as shown in FIG. 7) when element 55 swings to the left from its at rest position at the right. AT its right resting position, the push knob is up.

Suitable means are provided for pivoting element 55. For this purpose, one means comprising drive brackets 62 and 63 securely fixed to the light baffle 56 may be used (FIG. 6). Attached to brackets 62 and 63 in a pivotal relationship at points 64 is a drive adapter 78 which is driven, i.e. depressed by knob 77. A spring 80 (FIG. 7) holds knob 77 in an upper position. When the scan drive brackets 62 and 63 are moved up or down over a small portion of an arc, the parallelogram 55 swings from side to side. In FIG. 7, the centerline of the lens is shown scanning the length of the line *a–b*. Pressure exerted downward on the knob 77 causes the drive scan brackets 62 and 63 to be depressed (FIG. 7*a*). This causes the lens support 58 with the lens 65 to swing to the left side in a scan extending to point *a*. When pressure on the knob 77 is released, the return spring 80 forces the knob back up until it returns to its original resting position. During this motion, the lens 65 is moved along the line to the right (FIG. 7*b*) and comes to rest over point *b* at the extreme right end of line *a –b* (FIG. 7*c*).

The length of scan (line *a–b*) afforded by the parallelogram can be of convenient length. Specifically, for example, it may be in excess of 1 inch long so that a document of 2¼inches in length can be scanned (with an object to image ratio of 1:1) by a swing range of 1⅛ inch. By using a lens with a focal length of 1½ inches a document may be placed 3 inches away from the lens on one side and the photocell array 3 inches away from the lens on the other side. When these dimensions are used a basic minimum separation of the photocell array from the document should not be less than 6 inches; as a practical matter to accommodate the mechanics of the reader the separation distance will be slightly greater. A lens with a shorter focal length would not be suitable to scan a document whose length is as long as 2¼inches because a lens with a shorter focal length, in order to scan over the same size document, would have to be able to remain in sharp focus over a wider angle of view. There is a practical limit on how wide this angle can be before the image is badly degraded. Also, in the embodiment of FIGS. 5—7, as the lower part of the parallelogram which supports the lens moves from side to side during scanning action, the lens changes its distance from the document by an amount shown between arrows *c* and *d* in FIG. 7. For a given swing range, a lens with a long focal length will change its distance from the document to a lesser extent than a lens with a short focal length. This change in distance of the lens from the document although slight causes some defocusing to occur at each swing extremity. The greater the change in distance (as for a lens with a shorter focal length) of the lens to the document, the more severe will be the degradation of the optical image. Thus from the standpoint of swinging the lens over a given swing range while at the same time keeping its change of distance from the document as small as possible, a lens with a longer focal length is desirable. However, a lens with a longer focal length will cause the size of the hand held reader to become unwieldy and impractical. Accordingly, the focal length selected requires some compromise insofar as reader size and document length are concerned.

Referring again to FIG. 5, the reader which comprises a front and backwall and left and right sidewalls, 71, 72, 73 and 74 is illustrated in position on a ticket 91 aligned with index masks 93 and 94 respectively on the ticket 91. The base of sidewall is preferably contoured at 75 and 76 to better accommodate documents adhered to cylindrical surfaces. When the knob or handle 77 is depressed, through the linkage of member 78 with brackets 62 and 63 which are pivoted at 64, the parallelogram 55 is swung to the left (FIG. 7*a*). The lens 65 and lens mount 58 is maintained parallel to the plane of ticket 91 as noted in the description of FIG. 7. The ticket 91 or other printed document, is read when the knob 77 is pushed down, i.e., the ticket is read as the pendulumlike light shade member 55 moves from its at rest position shown at FIG. 7*c* to the far left position of FIG. 7*a*. When the knob 77 is released, a suitable disconnect switch (not shown) is employed so that the computer with which the reader is associated is not responsive to the reader. A suitable light source, two bulbs being shown at 85 and 86, is employed to illuminate the information 95 printed on the ticket. An array 87 of photoelectric detectors is employed to pick up the image of the printed information 95 through the lens 65.

Figure 8:
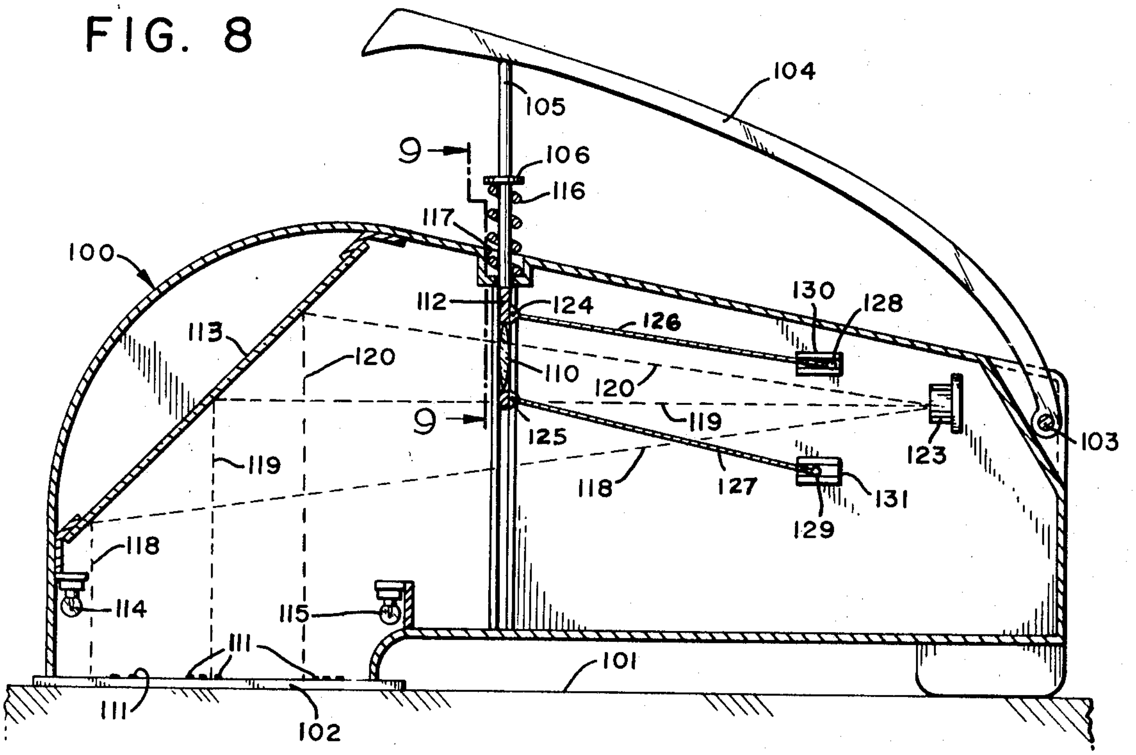
FIG. 8 is a side elevation in section of still another embodiment of the invention in which a scanning lens which is vertically movable with respect to the reading surface is used in combination with a reflecting surface.
Figure 9:
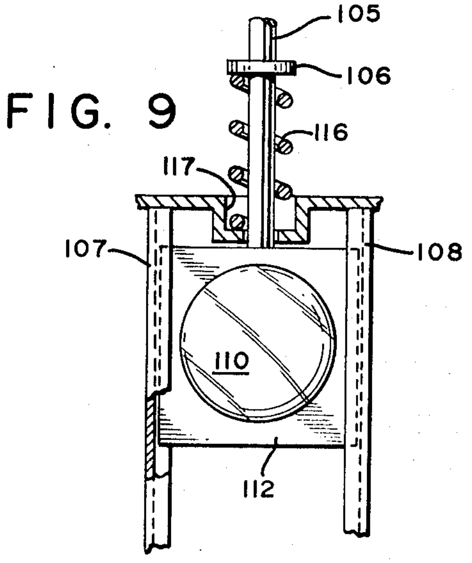
FIG. 9 is a view taken substantially along line 9–9 of FIG. 8.

Referring to the embodiment of FIG. 8, the reader 100 is shown in position over a document 102 to be read; the document 102 being attached to a surface 101. As with the embodiments of FIG. 2 and FIG. 5, the reader of FIG. 8 incorporates a scanning lens 110, an array of photoelectric detectors 123 and a light source, light bulbs 114 and 115. Additionally, the reader of FIG. 8 includes a reflectant surface 113 which together with the movable scanning lens 110 picks up the printed images 111 from surface 102 and transmits them to the photoelectric sensors 123. The scanning motion of the lens 110 is effected by mounting the lens 110 in a lens carrier 112 which is arranged to move vertically in slots 107 and 108. Movement of the lens 110 is generated by depressing the handle 104 which is pivotally connected to housing 100 and 103; this movement depresses the lens carrier extension 105 against the force of the spring 116. The spring which holds the handle 104 in the elevated position when at rest is held in place by stop 106 and by recess 117. Scan lines 118, 119 and 120 illustrate the scan of lens 110 at three different elevations of the lens carrier 112 in slots 107 and 108. When the handle 104 is released, the spring 116 acting against stop 106 returns the lens carrier 112 and handle 104 to its upper rest position. Pivotally connected on the lens carrier 112 at 124 and 125 are upper and lower light baffles 126 and 127 respectively which are flat sheet elements that are opaque to light and function similarly to member 56 and 57 described in FIG. 5. The other end of light baffles 126 and 127 are secured at 128 and 129 by pivotal slider connections in brackets 130 and 131 respectively. The sliding tolerance of connectors 130 and 131 allows the ends of baffles 126 and 127, as they pivot at 128 and 129, to move laterally. This permits the other ends of the baffles (connected to the lens carrier 112) at 124 and 125 to maintain a fixed distance from the photodetectors 123 during the lens scanning movement.

The mechanism involved in converting the images of the printed information into electrical signals, as well as techniques for processing the sensor output in logic circuits and other signal processing circuits, is well known in the art and will not be described here. DC or AC signal techniques may be employed. It is preferred, however, that AC coupling and AC signal techniques be used rather than DC sensor outputs. DC levels can shift with varying reflected light returned from the ticket. Ink density can also vary with DC outputs of the sensors. By the use of AC coupling circuits, this DC signal can be eliminated. In its place, the leading or trailing edge of the pulse produced by the transition of going from light to no-light, or no-light to light can be AC amplified and produce signals with greater reliability. Also, it may be desirable to incorporate impedance transforming circuits in the reader case itself to lower the relatively high impedance outputs from the sensors.

It will be understood that the embodiments described hereinabove are illustrative of the inventive concept and that various alternate arrangements can be devised by those skilled in the art without departing from the spirit and scope of the invention.

What I claim is:

1. A hand held photo-optical printed mark document reader comprising:
   - a housing which is located by hand on a document to be read and which substantially excludes extraneous light and is provided with an opening or window for viewing a document to be read;
   - a light source in said housing positioned to illuminate, through said window, a document over which the reader is placed;
   - an array of photoelectric detectors positioned in alignment to receive, through a lens a line of images simultaneously from the document to be read;
   - a lens situated between said window and said detectors and arranged to be movable essentially rectilinearly said lens operable to scan and focus printed images onto said photoelectric detectors;
   - manual means for moving said lens so that information on the document to be transmitted to said photoelectric detectors is scanned by the lens while said photoelectric detectors are held stationary with respect to said document; and
   - means for electronically converting the impulses which are generated by the printed marks on the document to be read and which are received by said photoelectric detectors.

2. A hand held photo-optical printed mark document reader comprising:
   - a housing which substantially excludes light said housing provided with a document viewing opening and being adapted to be positioned by hand over and to cover a document to be read;

a light source contained in the housing contiguous to the document viewing opening to illuminate the document to be read;

a photo-optical detector array positioned in the housing in alignment to receive simultaneously images from an entire line of printed marks on a document over which the housing is placed;

a movable light shade disposed between said light source and said photo-optical detector array and provided with a lens mounting opening therein;

a lens to focus printed images from a document to be read onto said photocell array, secured in the opening in said light shade and arranged to be movable essentially rectilinearly over a document to be read;

manually actuated means for moving said lens in a direction substantially perpendicular to the projected path of images so that said lens scans and focuses onto said photo-optical detector array sequentially line-by-line information printed on a document to be read while said array is held stationary with respect to said document; and means for electronically converting impulses generated by the printed marks on the document to be read and sensed by the photo-optical cells in said array.

3. The reader of claim 2 wherein the light shade comprises a flexible sheet horizontally mounted on spaced rollers.

4. The reader of claim 3 wherein at least one of said rollers is connected to gear members and a rack member connected to and arranged to drive said gear member.

5. The reader of claim 2 wherein the light shade comprises a pendulum unit comprising spaced side members which are substantially opaque to light and a lens support pivotally mounted at the bottom of said side members.

6. The reader of claim 5 wherein the pendulum unit housing the lens is held at one extreme of its scan by spring compression and by further compression of said spring said lens housed in the pendulum unit is carried across the information to be scanned.

7. The reader of claim 1 which incorporates a reflector element which picks up the images from the document to be read and reflects said images at approximately a 90° angle through said movable lens to said detector array.

8. The reader of claim 7 wherein the lens is mounted in a carrier for movement in a plane substantially perpendicular to the plane of a printed document to be read.

9. The reader of claim 8 wherein said lens carrier is located centrally in said housing and is actuated against the force of a return spring by a lever which is pivotally mounted near the end of said housing opposite to the end of said housing provided with said window.